US006925801B2

United States Patent
Kobayashi

(12) United States Patent
(10) Patent No.: US 6,925,801 B2
(45) Date of Patent: Aug. 9, 2005

(54) BRAKE HYDRAULIC PRESSURE CONTROLLER FOR A VEHICLE

(75) Inventor: Masashi Kobayashi, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 36 days.

(21) Appl. No.: 10/647,508

(22) Filed: Aug. 26, 2003

(65) Prior Publication Data
US 2004/0040298 A1 Mar. 4, 2004

(30) Foreign Application Priority Data
Aug. 27, 2002 (JP) .................................... P.2002-246732

(51) Int. Cl.⁷ ................................................ F15B 7/02
(52) U.S. Cl. ........................................ 60/538; 60/545
(58) Field of Search ..................... 60/545, 538; 303/10, 303/11, 139

(56) References Cited

U.S. PATENT DOCUMENTS 5,295,737 A   3/1994  Epple et al.
5,487,593 A   1/1996  Potts et al.
6,402,260 B1 * 6/2002 Kobayashi et al. ........... 303/11
2002/0101114 A1  8/2002  Kamiya et al.

FOREIGN PATENT DOCUMENTS

DE   44 08 879 A1    9/1995
EP   0 982 207 A2    3/2000
JP   61 150858       7/1986
JP   2001-071877     3/2001

OTHER PUBLICATIONS

European Search Report dated Dec. 3, 2003.

* cited by examiner

Primary Examiner—Edward K. Look
Assistant Examiner—Michael Leslie
(74) Attorney, Agent, or Firm—Greenblum & Bernstein, P.L.C.

(57) ABSTRACT

The control unit keeps the energization duty factor to the electric motor at 100% until a predetermined time elapses and thereafter executes control of the energization duty factor in accordance with the voltage of the battery.

15 Claims, 4 Drawing Sheets

BRAKE HYDRAULIC PRESSURE CONTROLLER FOR A VEHICLE

BACKGROUND OF THE INVENTION

The present invention relates to a brake hydraulic pressure controller for a vehicle comprising a pump for refluxing a brake fluid to a master cylinder, an electric motor which operates to drive the pump by way of power supply from a battery, and a control unit for controlling an energization amount to the electric motor by using an energization duty factor predetermined in accordance with the voltage of the battery.

Such a brake hydraulic pressure controller for a vehicle is known from the Unexamined Japanese Patent Application Publication No. 2001-71877.

The above-mentioned brake hydraulic pressure controller for a vehicle performs duty control of the energization amount to the electric motor in accordance with a variation in the battery voltage to reduce the operation sound while limiting the rotation speeds of the electric motor and the pumps so that they will not exceed the necessary values. While a starting torque is necessary to start an electric motor, the starting torque necessary to start the electric motor may not be obtained in the above-mentioned brake hydraulic pressure controller for a vehicle. Conversely, in case a duty factor is determined considering also the start of an electric motor, the steady rotation speed of the electric motor becomes higher than necessary.

SUMMARY OF THE INVENTION

The invention is accomplished in view of the above circumstances and aims at providing a brake hydraulic pressure controller for a vehicle where a start delay of an electric motor is prevented by reducing the operation sound in steady rotation of the electric motor while obtaining a necessary start torque in starting the electric motor.

In order to attain the above object, the invention provides a brake hydraulic pressure controller for a vehicle comprising a pump for refluxing a brake fluid to a master cylinder, an electric motor which operates to drive the pump by way of a power supply from a battery, and a control unit for controlling an energization amount to the electric motor by using an energization duty factor predetermined in accordance with the voltage of the battery, characterized in that the control unit keeps the energization duty factor to the electric motor at 100% until a predetermined time elapses and thereafter executes control of the energization duty factor in accordance with the voltage of the battery.

With this configuration, from when the electric rotor is started to when the predetermined time elapses, the energization duty factor of the electric motor is 100% irrespective of the battery voltage. Thus it is possible to prevent a start delay of the electric motor by ensuring that a necessary start torque is obtained. When the electric motor reaches a steady rotation by the elapse of the predetermined time, the energization amount to the electric motor is controlled by using the duty factor in accordance with the battery voltage, which prevents the rotation speeds of the electric motor and the pumps from becoming higher than necessary thus reducing the operation sound and saving power consumption.

DETAILED DESCRIPTION OF THE PREFERRED EMBODIMENTS

An embodiment of the invention will be described referring to the attached drawings.

Figure 1:
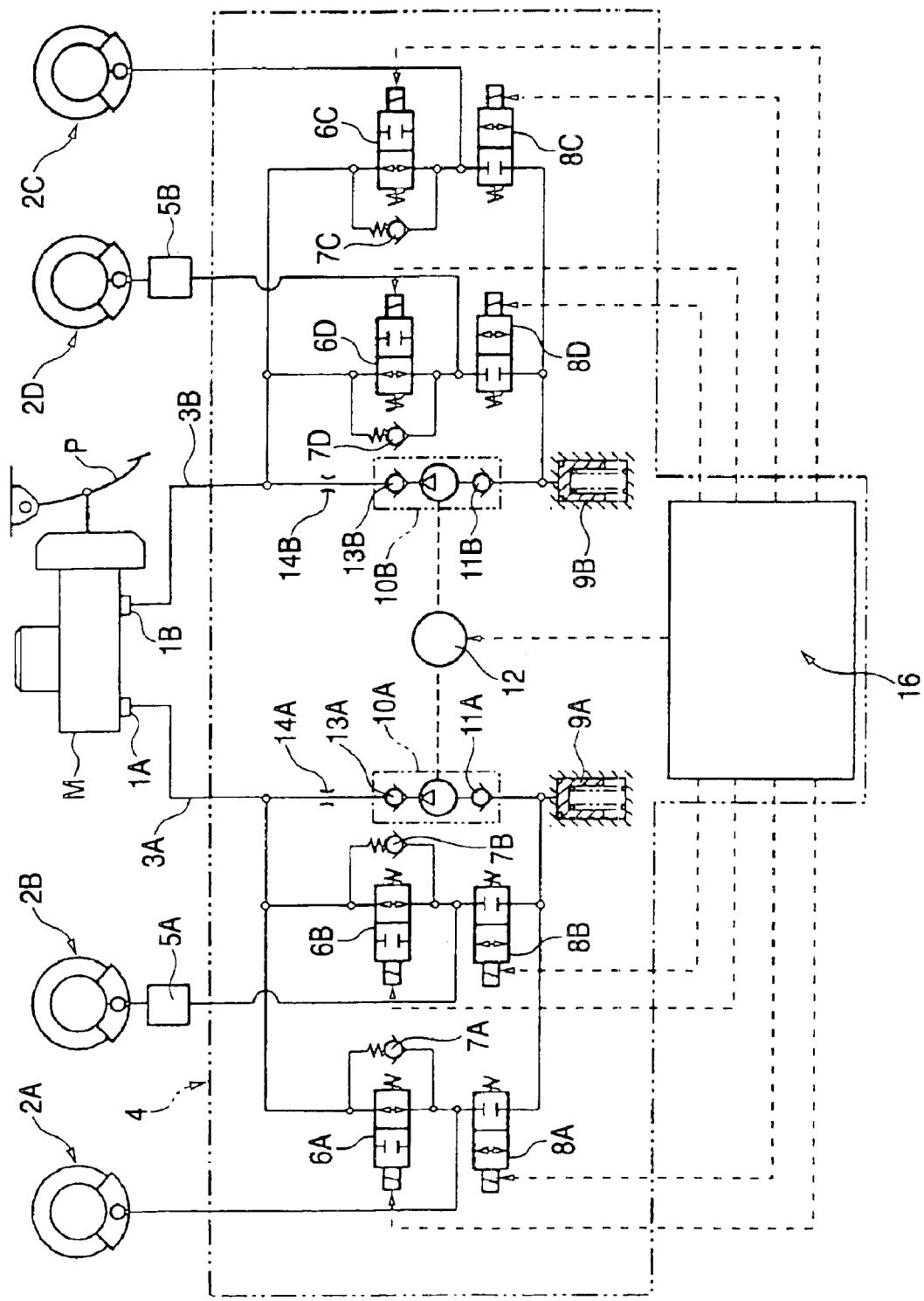
FIG. 1 shows a hydraulic circuit of a braking unit for a vehicle.
Figure 2:
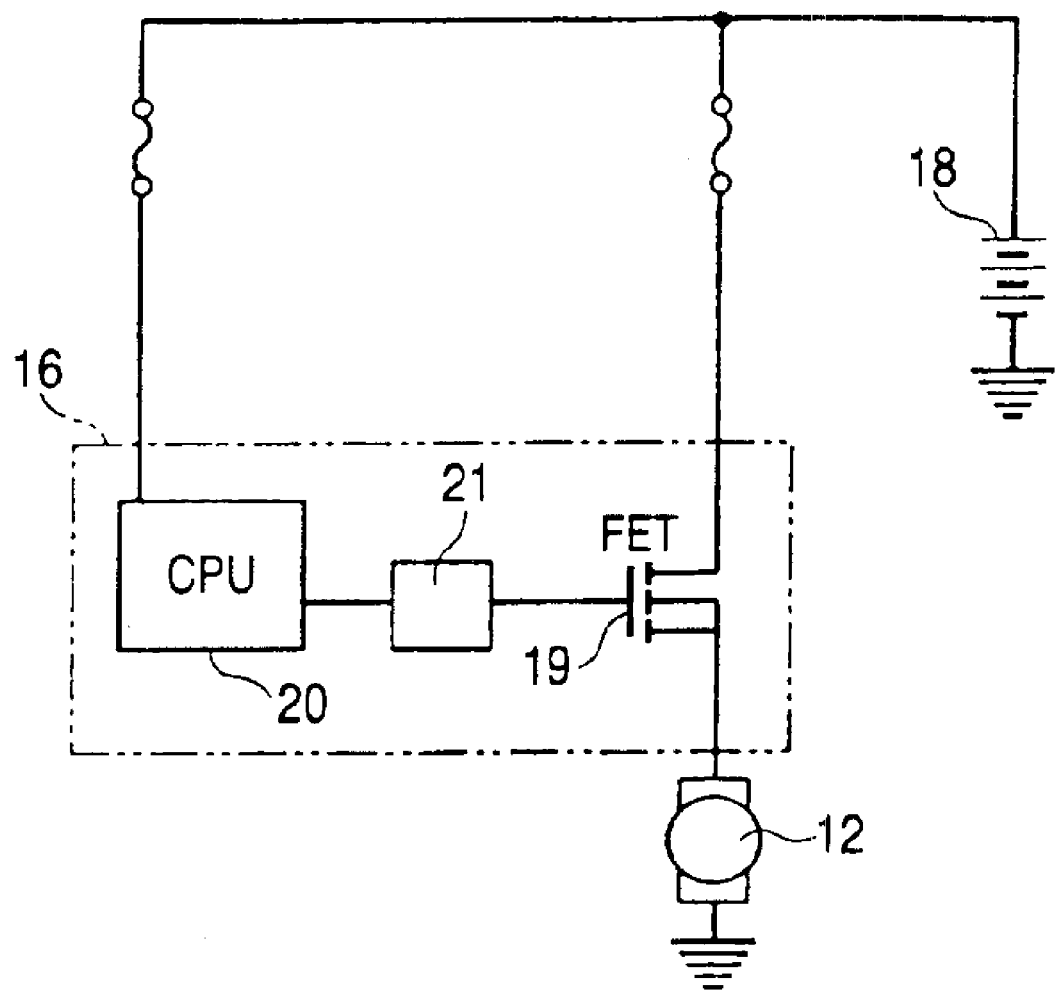
FIG. 2 shows the configuration of an electric circuit for controlling the rotation speed of an electric motor.
Figure 3:
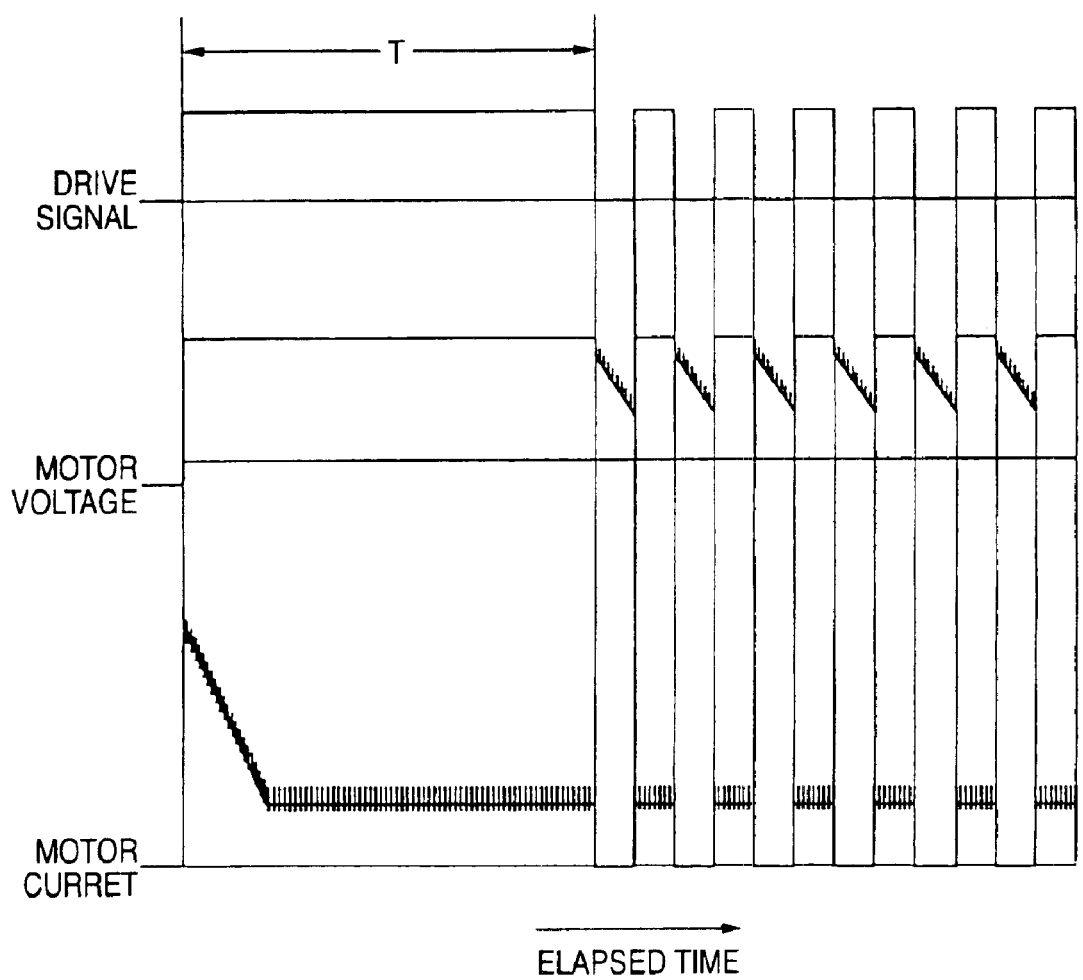
FIG. 3 shows the energization control mode for the electric motor.
Figure 4:
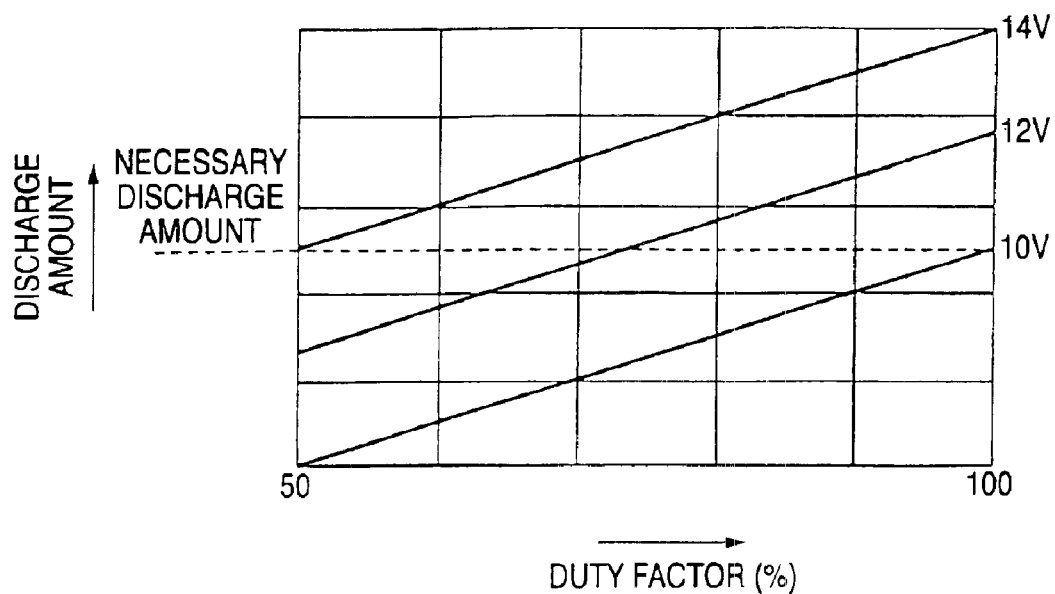
FIG. 4 shows the relationship between the energization duty factor and the discharge amount using an applied voltage as a parameter in the state where the output hydraulic pressure of a master cylinder is highest.
Figure 5:
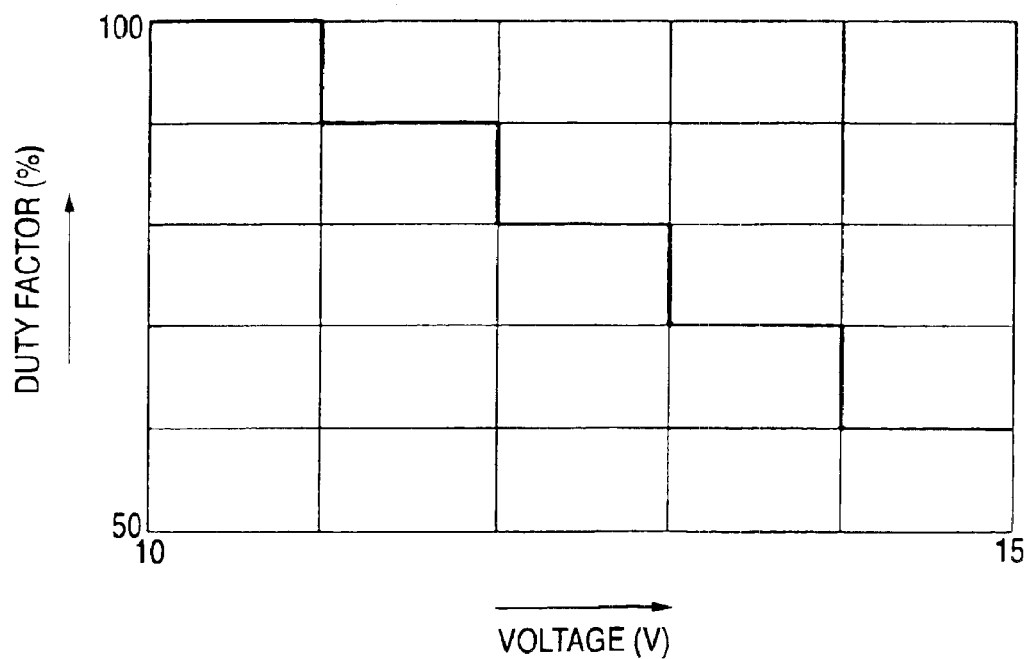
FIG. 5 shows a map of the applied voltage and the duty factor.

FIGS. 1 through 5 show an embodiment of the invention. FIG. 1 shows a hydraulic circuit of a braking unit for a vehicle. FIG. 2 shows the configuration of an electric circuit for controlling the rotation speed of an electric motor. FIG. 3 shows the energization control mode for the electric motor. FIG. 4 shows the relationship between the energization duty factor and the discharge amount using an applied voltage as a parameter in the state where the output hydraulic pressure of a master cylinder is highest. FIG. 5 shows a map of the applied voltage and the duty factor.

First, in FIG. 1, a tandem-type master cylinder M comprises a first and a second output port 1A, 1B which each generates a brake hydraulic pressure in accordance with a leg-power a vehicle driver applies on a brake pedal P. A brake hydraulic pressure controller 4 is provided between a wheel brake for the left front wheel 2A, wheel brake for the right rear wheel 2B, wheel brake for the right front wheel 2C, wheel brake for the left rear wheel 2D and a first and a second output hydraulic passage 3A, 3B individually connected to the first and second output ports 1A, 1B. A first and a second proportional pressure control valve 5A, 5B are respectively interposed between the brake hydraulic pressure controller 4 and the wheel brakes for the right and left rear wheels 2B, 2D.

The brake hydraulic pressure controller 4 comprises; a first, a second, a third and a fourth normally open solenoid valve 6A through 6D individually corresponding to the wheel brake for the left front wheel 2A, wheel brake for the right rear wheel 2B, wheel brake for the right front wheel 2C and wheel brake for the left rear wheel 2D; a first, a second, a third and a fourth check valve 7A through 7D respectively connected in parallel with the normally open solenoid valves 6A through 6D; a first, a second, a third and a fourth normally closed solenoid valve 8A through 8D individually corresponding to the wheel brakes 2A through 2D; a first and a second reservoir 9A, 9B respectively corresponding to the first and second output hydraulic passages 3A, 3B; a first and a second plunger-type pump 10A, 10B having suction valves 11A, 11B connected to the first and second reservoirs 9A, 9B and discharge valves 13A, 13B; a common electric motor 12 for driving both pumps 10A, 10B; orifices 14A, 14B provided between the both pumps 10A, 10B and the both output hydraulic passages 3A, 3B; and a control unit 16 for controlling the operation of the normally open solenoid valves 6A through 6D, normally closed solenoid valves 8A through 8D and the electric motor 12.

The first normally open solenoid valve 6A is provided between the first output hydraulic passage 3A and the wheel brake for the left front wheel 2A. The second normally open solenoid valve 6B is provided between the first output hydraulic passage 3A and the first proportional pressure control valve 5A. The third normally open solenoid valve 6C is provided between the second output hydraulic passage 3B and the wheel brake for the right front wheel 2C. The fourth normally open solenoid valve 6D is provided between the second output hydraulic passage 3B and the second proportional pressure control valve 5B.

The first through fourth check valves 7A through 7D are connected in parallel with the normally open solenoid valves 6A through 6D so as to allow the flow of a brake fluid from the corresponding wheel brakes 2A through 2D to the master cylinder M.

The first normally closed solenoid valve 8A is provided between the wheel brake for the left front wheel 2A and the first reservoir 9A. The second normally closed solenoid valve 8B is provided between the first proportional pressure control valve 5A and the first reservoir 9A. The third normally closed solenoid valve 5C is provided between the wheel brake for the right front wheel 2C and the second reservoir 9B. The fourth normally closed solenoid valve 8D is provided between the second proportional pressure control valve 5B and the second reservoir 9B.

The brake hydraulic pressure controller 4 communicates the master cylinder M with the wheel brakes 2A through 2D in the steady braking where there is no possibility of lock for each wheel while interrupts the wheel brakes 2A through 2D from the reservoirs 9A, 9B. In other words, the normally open solenoid valves 6A through 6D are placed in the demagnetized and open state while the normally closed solenoid valves 8A through 8D are placed in the demagnetized and closed state. The brake hydraulic pressure output from the first output port 1A of the master cylinder M acts on the wheel brake for the left front wheel 2A via the first normally open solenoid valve 6A as well as acts on the wheel brake for the right rear wheel 2B via the second normally open solenoid valve 6B and the first proportional pressure control valve 5A. The brake hydraulic pressure output from the second output port 1B of the master cylinder M acts on the wheel brake for the right front wheel 2C via the third normally open solenoid valve 6C as well as acts on the wheel brake for the left rear wheel 2D via the fourth normally open solenoid valve 6D and the second proportional pressure control valve 5B.

When a wheel which is likely to become locked in the above braking, the brake hydraulic pressure controller 4 interrupts the master cylinder M from the wheel brakes 2A through 2D at a point corresponding to the wheel which is likely to become locked as well as communicates the wheel brakes 2A through 2D with the reservoirs 9A, 9B. In other words, the normally open solenoid valve out of the first through fourth normally open solenoid valves 6A through 6D corresponding to a wheel which is likely to become locked is magnetized and closed while the normally closed solenoid valve out of the first through fourth normally closed solenoid valves 8A through 8D corresponding to the wheel is magnetized and opened. With this process, part of the brake hydraulic pressure of the wheel which is likely to become locked is absorbed in the first reservoir 9A or second reservoir 9B thereby reducing the brake hydraulic pressure of the wheel which is likely to become locked.

To keep the brake hydraulic pressure constant, the brake hydraulic pressure controller 4 interrupts the wheel brakes 2A through 2D from the master cylinder M and the reservoirs 9A, 9B. In other words, the normally open solenoid valves 6A through 6D are magnetized and closed while the normally closed solenoid valves 8A through 8D are demagnetized and closed. When the brake hydraulic pressure is increased, the normally open solenoid valves 6A through 6D are demagnetized and opened while the normally closed solenoid valves 8A through 8D are demagnetized and closed.

In this way, by controlling demagnetization and magnetization of the normally open solenoid valves 6A through 6D and the normally closed solenoid valves 8A through 8D, it is possible to control the wheels without locking them.

In FIG. 2, the power from a battery 18 undergoes energization control by a control unit 16 and then supplied to an electric motor 12. The control unit 16 comprises a switching device 12 such as an FET provided between the battery 18 and the electric motor and a CPU 20 for controlling conduction/interruption of the switching device 19 via a booster circuit 21 for boosting a voltage.

To the CPU 20 is connected the battery 18 to monitor the voltage of the battery 18. The CPU controls conduction/interruption of the switching device 19 so that, at the start of the electric motor 12, the energization duty factor to the electric motor 12 is kept at 100% until a predetermined time T, for example 100 ms elapses, and thereafter the energization duty factor in accordance with the voltage of the battery 18 is obtained.

As shown in FIG. 3, from when the electric motor 12 is started to when the predetermined time T elapses, a drive signal to keep the switching device 19 in conduction is output from the CPU 20. Accordingly, a voltage applied to the electric motor 12 by the battery 18 becomes constant as shown in FIG. 3. A current supplied from the battery 18 to the electric motor 12 varies as shown in FIG. 3.

To control the energization of the electric motor 12 by using an energization duty factor in accordance with the voltage of the battery 18 after the predetermined time T elapses since the start of the electric motor 12, the duty factor and the discharge amount whose parameter is the applied voltage in a state where the output hydraulic pressure of the master cylinder M is highest, that is, where the load on the electric motor 12 is maximum have the relationship shown in FIG. 4. The energization duty factor to reserve the necessary discharge amount for the pumps 10A, 10B to rotate the electric motor 12 is preset as shown in FIG. 5, based on the relationship shown in FIG. 4. The CPU 20 controls conduction/interruption of the switching device 19 so as to perform duty factor control of the energization of the electric motor 12 by the battery 18 by using the energization duty factor which is based on the map of FIG. 5.

The operation of this embodiment will be described. In the steady rotation after the predetermined time T elapses since the start of the electric motor 12 in initial diagnosis or in operating the electric motor 12 to control an anti-lock brake, conduction/interruption of the switching device 19 is controlled to control the energization amount of the electric motor 12 so that the energization duty factor in accordance with the voltage of the battery 18 will be obtained. This makes it possible to keep relatively low rotation speeds of the electric motor 12 and the pumps 10A, 10B. This reduces the operation sound of the electric motor 12 and the pumps 10A, 10B abs well as saves power consumption.

The discharge amounts of the pumps 10A, 10B are suppressed thus reducing the pulsing of the brake fluid back-flow to the master cylinder M. This alleviates the kickback to a brake pedal P in anti-lock braking thus improving the feel of brake operation.

Further, from when the electric motor 12 is started to when the predetermined time T elapses, the energization duty factor of the electric motor 12 is 100% irrespective of voltage of the battery 18. Thus it is possible to prevent a start delay of the electric motor 12 by ensuring that a necessary start torque is obtained.

While the embodiments of the invention are described hereinabove, the invention is not limited to the foregoing embodiments. Various design changes can be made in the invention without departing from the spirit and scope defined in the claims.

As mentioned hereinabove, according to the invention, it is possible to prevent a start delay of an electric motor by ensuring that a necessary start torque is obtained. When the electric motor reaches steady rotation, it is possible to prevent the rotation speeds of the electric motor and the pumps from becoming higher than necessary thus reducing the operation sound and saving power consumption.

What is claimed is:

1. A brake hydraulic pressure controller for a vehicle comprising:
    a pump for refluxing a brake fluid to a master cylinder,
    an electric motor which operates to drive said pump by way of a power supply from a battery, and
    a control unit for controlling an energization amount to said electric motor by using an energization duty factor predetermined in accordance with the voltage of said battery, wherein
    said control unit keeps the energzation duty factor to said electric motor at 100% until a predetermined time elapses, irrespective of the voltage, and thereafter executes control of the energization duty factor in accordance with the voltage of said battery.

2. The brake hydraulic pressure controller for a vehicle according to the claim 1, wherein the predetermined time is 100 msec.

3. The brake hydraulic pressure controller for a vehicle according to the claim 1, wherein said control unit keeps the energization duty factor of said electric motor at 100% irrespective of the battery voltage from when the electric motor is started to when the predetermined time elapses.

4. The brake hydraulic pressure controller for a vehicle according to the claim 1, wherein said control unit prevents a start delay of said electric motor by ensuring a predetermined start torque is obtained.

5. The brake hydraulic pressure controller for a vehicle according to the claim 1, wherein said control unit controls an energization amount to said electric motor by using the energization duty factor in accordance with the battery voltage, which prevents rotation speeds of said electric motor and said pump from becoming higher than a determined amount.

6. The brake hydraulic pressure controller for a vehicle according to the claim 5, wherein said control unit prevents the rotation speeds of said electric motor and said pump from becoming higher than the determined amount when said electric motor reaches a steady rotation by the elapse of the predetermined time.

7. The brake hydraulic pressure controller for a vehicle according to the claim 1, wherein said control unit comprises:
    a switching device provided between said battery and said electric motor; and
    a processing unit for controlling conduction/interruption of said switching device via a booster circuit for boosting a voltage.

8. The brake hydraulic pressure controller for a vehicle according to the claim 7, wherein said processing unit controls the conduction/interruption of said switching device so that, at the start of said electric motor, the energization duty factor to said electric motor is kept at 100% until the predetermined time T, and thereafter the energization duty factor in accordance with the voltage of the battery is obtained.

9. The brake hydraulic pressure controller for a vehicle according to the claim 7, wherein said energization duty factor to reserve a necessary discharge amount for the pump to rotate said electric motor is preset.

10. A brake hydraulic pressure controller for a vehicle comprising:
    a pump for refluxing a brake fluid to a master cylinder,
    an electric motor which operates to drive said pump by way of a power supply from a battery, and
    a control unit comprising:
        a switching device provided between said battery and said electric motor; and
        a processing unit for controlling conduction/interruption of said switching device via a booster circuit for boosting a voltage, wherein said control unit keeps an energization duty factor to said electric motor at 100% from a start time to a predetermined elapsed time, irrespective of the voltage, and thereafter executes control of the energization duty factor in accordance with the voltage of said battery.

11. The brake hydraulic pressure controller according to the claim 10, wherein said control unit keeps the energization duty factor of said electric motor at 100% irrespective of the battery voltage from when said electric motor is started to when the predetermined time elapses.

12. The brake hydraulic pressure controller according to the claim 10, wherein said control unit prevents the rotation speeds of said electric motor and said pump from becoming higher than the determined amount when said electric motor reaches a steady rotation by the elapse of the predetermined time.

13. The brake hydraulic pressure controller according to the claim 10, wherein said processing unit controls the conduction/interruption of said switching device so that, at the start of said electric motor, the energization duty factor to said electric motor is kept at 100% until the predetermined time T, and thereafter the energization duty factor in accordance with the voltage of the battery is obtained.

14. The brake hydraulic pressure controller according to the claim 10, wherein the energization duty factor to reserve the necessary discharge amount for the pump to rotate said electric motor is preset.

15. The brake hydraulic pressure controller according to the claim 10, wherein said control unit prevents a start delay of said electric motor by ensuring a predetermined start torque is obtained.

* * * * *

UNITED STATES PATENT AND TRADEMARK OFFICE
CERTIFICATE OF CORRECTION

PATENT NO. : 6,925,801 B2
DATED : August 9, 2005
INVENTOR(S) : M. Kobayashi

It is certified that error appears in the above-identified patent and that said Letters Patent is hereby corrected as shown below:

Column 5,
Line 27, "energzation" should be -- energization --.

Signed and Sealed this

Twenty-fifth Day of April, 2006

JON W. DUDAS
*Director of the United States Patent and Trademark Office*